US007774001B2

(12) United States Patent
Richey et al.

(10) Patent No.: US 7,774,001 B2
(45) Date of Patent: Aug. 10, 2010

(54) DEVICE AND METHOD FOR DETERMINING WHERE CROWDS EXIST

(75) Inventors: William M. Richey, Durham, NC (US); Greg A. Dunko, Cary, NC (US); Gary Thomas, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 681 days.

(21) Appl. No.: 11/303,151

(22) Filed: Dec. 16, 2005

(65) Prior Publication Data

US 2007/0142065 A1    Jun. 21, 2007

(51) Int. Cl.
*H04W 24/00* (2009.01)
(52) U.S. Cl. ............... 455/456.1; 455/414.1; 455/418; 455/456.2; 455/456.3; 455/456.5; 455/456.6; 455/457; 705/21; 701/209
(58) Field of Classification Search ............... 455/414.1, 455/418, 456.1–456.6, 457; 705/21; 701/209
See application file for complete search history.

(56) References Cited

U.S. PATENT DOCUMENTS

| | | | | |
|---|---|---|---|---|
| 6,311,165 | B1 * | 10/2001 | Coutts et al. | ............... 705/21 |
| 6,892,133 | B2 * | 5/2005 | Kornhauser et al. | ......... 701/209 |
| 7,541,926 | B2 * | 6/2009 | Dugan et al. | ............ 340/572.1 |
| 2002/0072347 | A1 | 6/2002 | Dunko et al. | |
| 2002/0183068 | A1 | 12/2002 | Dunko et al. | |
| 2004/0203633 | A1 * | 10/2004 | Knauerhase et al. | ..... 455/414.1 |
| 2004/0224703 | A1 * | 11/2004 | Takaki et al. | ................ 455/457 |
| 2005/0045710 | A1 * | 3/2005 | Burke | ......................... 235/375 |
| 2005/0144049 | A1 * | 6/2005 | Kuzunuki et al. | .............. 705/6 |
| 2005/0198545 | A1 | 9/2005 | Wieck et al. | |
| 2005/0202806 | A1 | 9/2005 | Bourgeois et al. | |

FOREIGN PATENT DOCUMENTS

| | | | |
|---|---|---|---|
| WO | WO 02/084556 | * | 10/2002 |
| WO | 03/084179 A1 | | 10/2003 |

OTHER PUBLICATIONS

International Preliminary Report on Patentability for International Application No. PCT/US06/28124 dated Mar. 26, 2008.
International Search Report and Written Opinion for International Application No. PCT/US2006/028124 mailed Nov. 13, 2006.

* cited by examiner

*Primary Examiner*—Stephen M D'Agosta
(74) *Attorney, Agent, or Firm*—Renner, Otto, Boisselle & Sklar, LLP (57) ABSTRACT

A portable communication device includes an application program for determining crowdedness of a desired location. The portable communication device executes the application program to communicate within a wireless communication system for requesting mobile critical mass information for at least one desired location. The mobile critical mass information for the at least one desired location is received and converted into a user-understandable format. The converted mobile critical mass information is displayed as crowdedness information on a display of the portable communication device. Portable communication device users can seek out or avoid crowds depending on their preference.

8 Claims, 5 Drawing Sheets

DEVICE AND METHOD FOR DETERMINING WHERE CROWDS EXIST

TECHNICAL FIELD OF THE INVENTION

The present invention relates generally to portable communication devices, and, more particularly, to a portable communication device and associated method for determining the crowdedness of a desired location.

DESCRIPTION OF RELATED ART

In recent years, portable communication devices, such as mobile phones, personal digital assistants, mobile terminals, etc., continue to grow in popularity. At least anecdotally, it can be said that everyone seems to have a mobile phone these days. As the popularity of portable communication devices continues to grow, today's wireless landscape is rapidly changing as mobile phones and networks are being enhanced to provide services beyond voice services. The wireless industry is experiencing a rapid expansion of mobile data services.

The expansion of mobile data services is driven by continued technological advancement, as well as by the demand from users of portable communication devices. Portable communication devices are appealing to users because of their capability to serve as powerful communication and data service tools. With the increasingly busy lifestyles of many users of portable communication devices, users are placing a premium on making efficient use of time—both during and outside of work hours. When people are busy, sometimes it is nice being around a crowd, while other times it is not.

SUMMARY

In view of the foregoing, a need exists for additional mobile data services, and application programs for providing additional mobile data services, especially programs and services that allow users to make more efficient use of their time by providing information on the crowdedness of desired locations. A further need exists for programs and services that support user safety.

According to one aspect of the invention, the invention is directed to a method of determining where crowds exist. The method includes requesting mobile critical mass information for at least one desired location from a mobile network server, receiving mobile critical mass information corresponding to the at least one desired location, converting the received mobile critical mass information into crowdedness information, and outputting the crowdedness information in a user-sensible format.

According to another aspect of the invention, the invention is directed to a program stored on a machine readable medium, the program being suitable for use in a portable communication device, wherein, when the program is loaded in memory in the portable communication device and executed, causes the portable communication device to request mobile critical mass information for at least one desired location from a mobile network server, receive mobile critical mass information corresponding to the at least one desired location, convert the received mobile critical mass information into crowdedness information, and output the crowdedness information in a user-sensible format.

According to another aspect of the invention, the invention is directed to a portable communication device that includes a memory and a processor that executes an application program within the memory. The application program, when executed, causes the portable communication device to request mobile critical mass information for at least one desired location from a mobile network server, receive mobile critical mass information corresponding to the at least one desired location, convert the received mobile critical mass information into crowdedness information, and output the crowdedness information in a user-sensible format.

According to another aspect of the invention, the invention is directed to a method of determining where crowds exist that includes collecting mobile critical mass information for a plurality of portable communication devices, converting the mobile critical mass information into crowdedness information for a given location, and transmitting the crowdedness information to a requesting portable communication device for output in a user-sensible format.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended thereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF DRAWINGS

Many aspects of the invention can be better understood with reference to the following drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

DETAILED DESCRIPTION OF EMBODIMENTS

In the detailed description that follows, like components have been given the same reference numerals regardless of whether they are shown in different embodiments of the present invention. To illustrate the present invention in a clear and concise manner, the drawings may not necessarily be to scale and certain features may be shown in somewhat schematic form.

Aspects of the present invention will be described in connection with a portable communication device and a method of determining the crowdedness of a desired location to be carried out on or using a portable communication device.

As used herein, the term portable communication device includes portable radio communication equipment. The term portable radio communication equipment, which herein after is referred to as a mobile phone, a mobile device, a mobile radio terminal or a mobile terminal, includes all equipment, including, but not limited to, mobile telephones, pagers, communicators, i.e., electronic organizers, smartphones, personal digital assistants (PDAs), or the like. While the present invention is being discussed with respect to portable communication devices, it is to be appreciated that the invention is not intended to be limited to portable communication devices, and can be applied to any type of electronic equipment capable of being used for voice and/or data communication.

Figure 1:
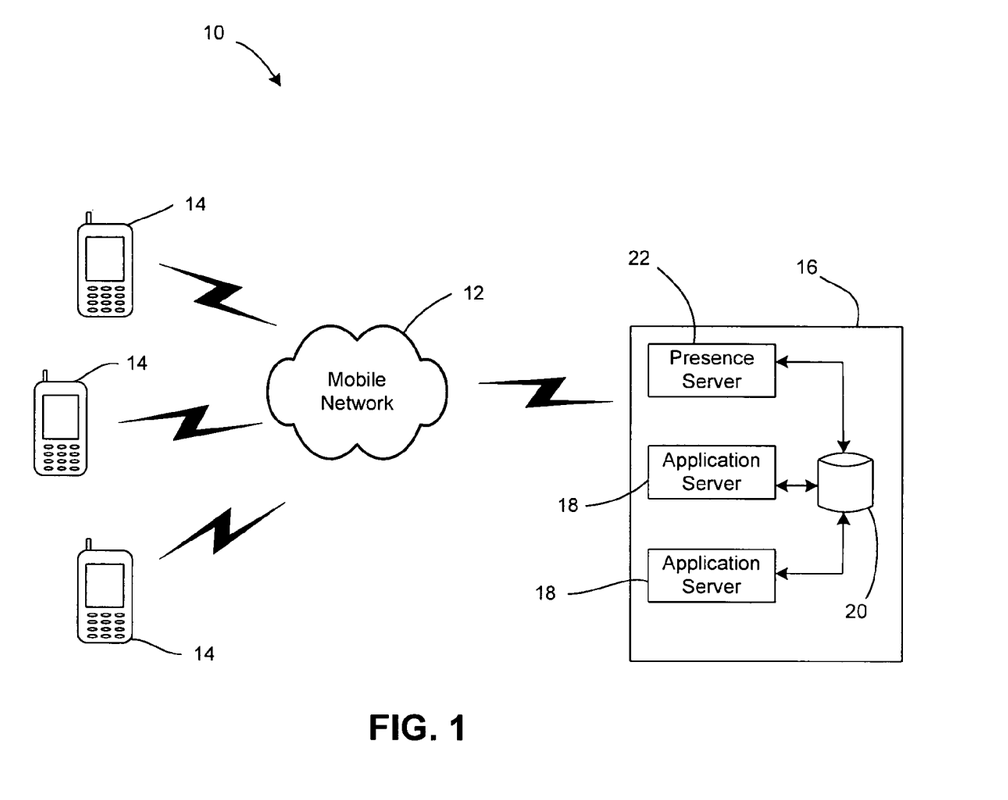
FIG. 1 is a diagrammatic illustration of a communication system including portable communication devices on which the present invention is carried out.

Referring initially to FIG. 1, a communication system 10 includes a mobile network 12, such as a mobile cellular telephony network, that facilitates communication, such as voice communication and/or data transfer between a plurality of portable communication devices 14, such as mobile phones, mobile terminals or the like. The communication system 10 includes a network infrastructure 16, portions of which are used or otherwise accessed by the portable communication devices in connection with aspects of the invention. The portable communication devices 14 may interact with each other and/or the network infrastructure in accordance with any suitable communication standard, including, but not limited to, Advanced Mobile Phone Service (AMPS), Digital Advanced Mobile Phone Service (D-AMPS), Global System for Mobile Communications (GSM), Code Division Multiple Access (CDMA) or the like. In other words, the communication system is shown in FIG. 1 for purposes of explaining aspects of the present invention, without limiting the invention to a particular communication system design, architecture or communication standard.

The network infrastructure 16 includes one or more application servers, which are indicated generally by the numeral 18, and a storage device 20, such as a memory for storing data accessible or otherwise usable by the application servers 18. At least one of the application servers is a presence server 22. The application servers 18, including the presence server 22, are computer servers that serve different functions in the communication system. As is described more fully below, the presence server 22 is operable to provide information usable by the portable communication devices 14 to carry out a method of determining the crowdedness of a desired location in accordance with aspects of the invention. As used herein, the term "presence server" includes any applicable application server capable of providing presence information (e.g., at least location information for portable communication devices), as discussed below. For purposes of this discussion, the term "presence server" may be replaced with location server without departing from the scope of the present invention.

Figure 2:
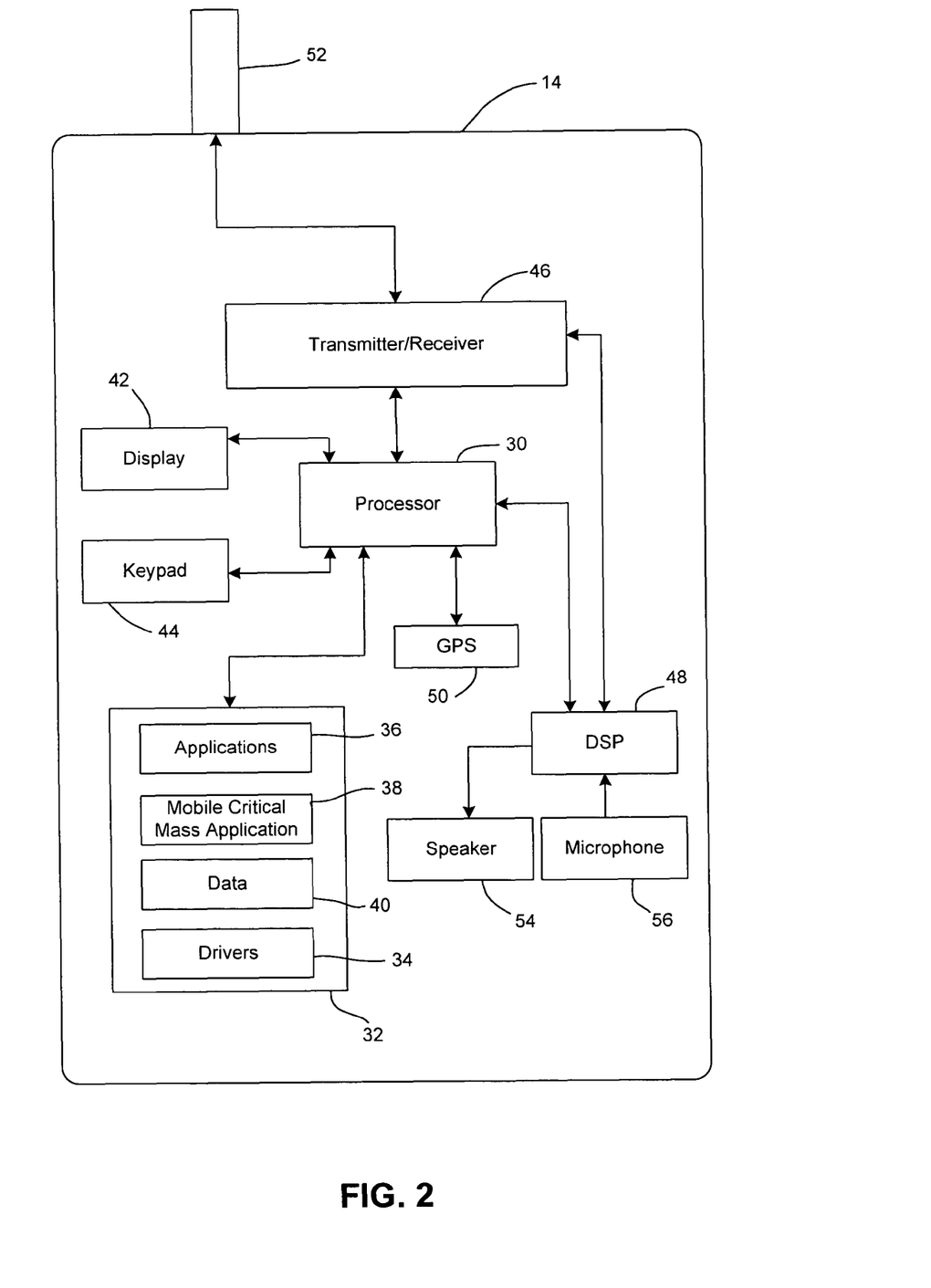
FIG. 2 is a diagrammatic illustration of a portable communication device in accordance with the present invention.

FIG. 2 represents a functional block diagram of a portable communication device 14 in accordance with the present invention. The portable communication device 14 includes a processor 30 for controlling the overall operation of the portable communication device 14. The processor 30 may be any commercially available or custom microprocessor. Memory 32 is operatively connected to the processor 30 for storing control programs and data used by the portable communication device. The memory 32 is representative of the overall hierarchy of memory devices containing software and data used to implement the functionality of the portable communication device in accordance with aspects of the present invention.

In the illustrated embodiment, memory 32 stores device drivers 34, e.g., I/O device drivers, application programs, indicated by reference numeral 36 generally, including a Mobile Critical Mass (MCM) application program 38 in accordance with the present invention, and application program data 40. The I/O device drivers include software routines that are accessed through the processor 32 (or by an operating system stored in memory 32 (not shown)) by the application programs 36, including the MCM application program 38, to communicate with devices such as the display 42 and other input/output ports.

The application programs 36, including the MCM application program 38, comprise programs that implement various features of the portable communication device 14, such as e-mail, Internet access, contact manager and the like. As is discussed more fully below, the MCM application program 38 comprises a program for determining crowdedness of one or more desired locations, and displaying the determined crowdedness in a user-readable format on display 42.

A person having ordinary skill in the art of computer programming, and specifically in applications programming for mobile phones, will consider it obvious in view of the description provided herein how to program a mobile phone to operate and carry out the functions described herein with respect to the Mobile Critical Mass (MCM) application program 38. Accordingly, details as to the specific programming code have been left out for the sake of brevity. Also, while the determination of crowdedness of a desired location is carried out via the processor and MCM application program 38 in memory 32 in accordance with aspects of the invention, such function could also be carried out via dedicated hardware, firmware, software or combinations thereof without departing from the scope of the present invention.

With continued reference to FIG. 2, the processor 30 interfaces with the display 42, a keypad 44, a transmitter/receiver 46 (often referred to as a transceiver), audio processing circuits, such as a digital signal processor (DSP) 48 (optional) and a Global Positioning System (GPS) 50 (optional) or other means of determining physical location. The keypad 44 and display 42 provide a user interface that allows the user to interact with the portable communication device. Keypad 44 allows the user to dial numbers, enter commands and data, and select options. The display 42 allows the user to view a variety of information, such as dialed digits, stored information, and output from various applications, including the MCM application program 38.

An antenna 52 is coupled to the transmitter/receiver 46 such that the transmitter/receiver 46 transmits and receives signals via the antenna 52, as is conventional. The portable communication device 14 includes an audio processing circuit 48 for processing the audio signal transmitted by and received from the transmitter/receiver 46. Coupled to the audio processing circuit 48 are a speaker 54 and microphone 56, which enable a user to listen and speak via the portable communication device. The optional GPS 50 is operable to provide location information for the portable communication device 14. As is described below, location information provided by the GPS may be useful in connection with determining crowdedness of a desired location.

Figure 3:
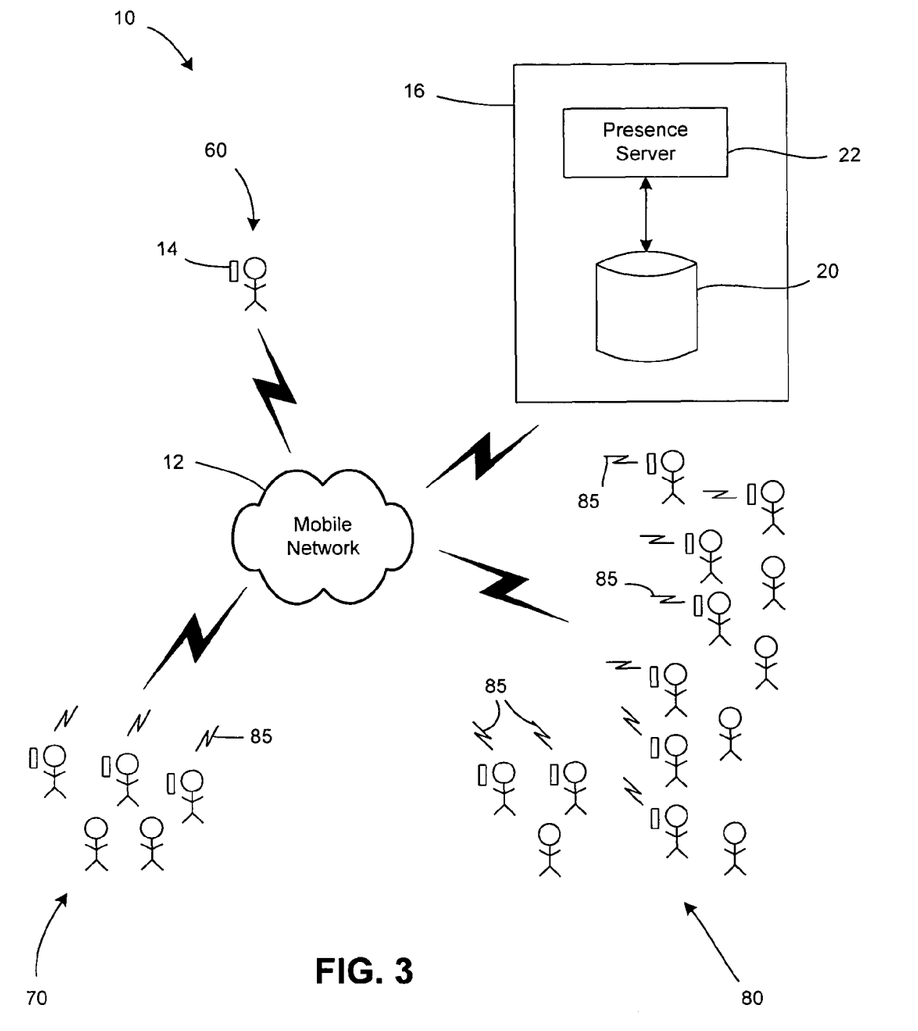
FIG. 3 is a diagrammatic illustration of an exemplary communication system including portable communication devices on which the present invention is carried out.
Figure 4:
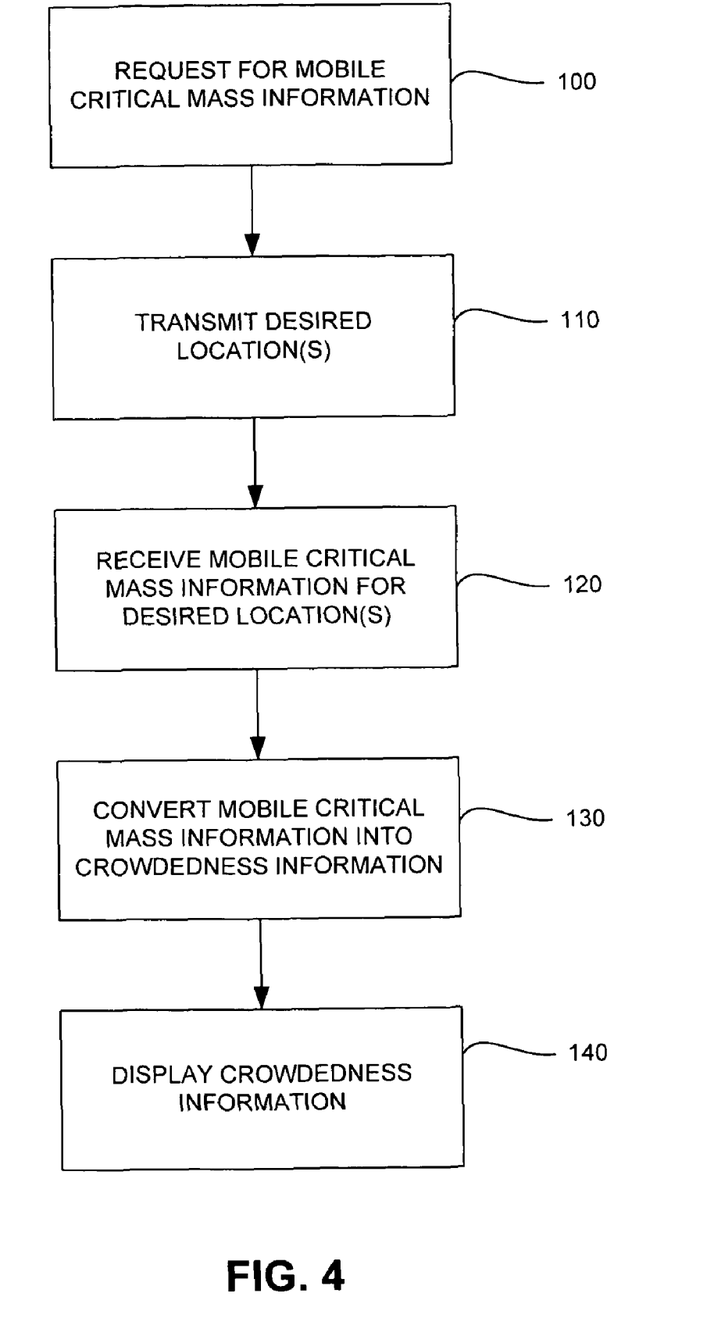
FIG. 4 is a flow chart illustrating a method of determining crowdedness of a desired location in accordance with the present invention.

Turning now to FIG. 3 and FIG. 4, a method of determining the crowdedness of a desired location is provided. The method flow chart of FIG. 4 will be described with respect to a communication system 10 illustrated in FIG. 3. In the illustrated exemplary embodiment, the communication system 10 includes a user 60 (also referred to as a subscriber) having a portable communication device 14, such as the portable communication device described above in connection with FIG. 2. As described above with respect to FIG. 1, the user's portable communication device is operable within a mobile network 12 for voice communication with and/or data transfer between a plurality of other portable communication devices, such as mobile phones or the like. The communication system includes a network infrastructure 16 having at least a presence server 22 or other suitable location server and a storage device 20.

For purposes of the description contained herein, the user 60 is interested in obtaining information on the crowdedness of at least a first location indicated generally by reference numeral 70 and a second location indicated generally by reference numeral 80. The desired locations can include any location, destination or resource in which a user may be interested, such as restaurants, shopping areas, movie theaters, banks and the like.

As will be apparent from the following description, the presence server 22 associated with mobile network 12 is operable to collect presence information, which is indicated generally by reference numeral 85, for other users of or subscribers to the mobile network 12. At a minimum, presence information includes presence of a mobile device at or near a given location. Presence information can include any relevant presence feature or attribute that is collectable by a presence server or other location server. Presence information can include, but is not limited to, a record of whether or not each user's mobile device is connected to or otherwise logged on to a network server (sometimes referred to as online status), a record of whether the mobile device is registered in the mobile network, a time zone associated with the mobile device, information about the user associated or otherwise registered in connection with the mobile device and a geographical location of the mobile device, as well as other presence information attributes.

For purposes of this discussion, presence information 85 for each mobile device includes at least location information. With this threshold of presence information 85, the MCM application program 38 can communicate with the presence server 22 to obtain presence information 85, and process the received presence information in order to determine and display crowdedness information for a user requesting such information.

As used herein, "mobile critical mass information" includes, but is not limited to, information related to the location of portable communication devices. Mobile critical mass information also can include location information for portable communication devices that, at a given time, are connected to or otherwise powered within, a mobile network, e.g., online status, and location information for those portable communication devices that are connected to or otherwise powered within the mobile network. Stated differently, "mobile critical mass information" includes, but is not limited to, presence information, including location information for portable communication devices. Stated even more simply, mobile critical mass information includes, but is not limited to, presence information or location information for all users or subscribers relative to a desired or predetermined location.

One of ordinary skill in the art will appreciate that the geographic location of a mobile device may be determined by the presence server or other suitable location server in a variety of ways, including, but not limited to, receiving mobile device location information from a GPS device within the mobile device via some communication means, determining location information based on proximity to one or more base stations, e.g., using triangulation, and the like.

Turning now to FIG. 4, a method of determining crowdedness of one or more desired locations begins at step 100 by requesting mobile critical mass information. In response to a command from the user, the MCM application program 38 generates a request for mobile critical mass information for one or more desired, e.g., user-selected, locations. In one embodiment, the request for mobile critical mass information is accompanied by transmitting the desired location(s) at step 110 for which mobile critical mass information is being requested. Identification and transmission of desired location(s) can be accomplished via user-selection, such as by using a drop-down menu, entering an address, selecting locations on a graphically displayed map or the like. In one embodiment, a single push-button request may initiate a request for mobile critical mass information for a number of pre-selected locations, e.g., a favorite location list. Alternatively, the user's current location may be transmitted automatically along with the request for mobile critical mass information. Automatic transmission of the user's current location may be useful in situations where the user desires to know if others are nearby, such as for reassurance when walking home late at night.

Returning to the exemplary embodiment illustrated in FIG. 3, the user may be interested in how crowded a first location 70, e.g., a first restaurant, is relative to a second location 80, e.g., a second restaurant, so that the user can select the restaurant with the smaller crowd, and, therefore, the shorter wait. Conversely, a location with a larger crowd may be desired, e.g., if the user is interested in visiting a club or other location where crowds are desirable.

The request for mobile critical mass information is transmitted to the presence server or other suitable application server. Upon receipt of the request, the presence server provides previously collected or contemporaneously collected presence information for other users or subscribers that are in proximity to each desired location. At step 120, the MCM application program 38 receives from the presence server mobile critical mass information for the desired location(s). Upon receipt of the relevant mobile critical mass information, at step 130, the mobile critical mass information is converted into a user-readable or user-understandable format. This step can be thought of as converting the received mobile critical mass information into crowdedness information for the desired location(s).

The conversion of mobile critical mass information into crowdedness information can be accomplished based on one or more user-defined parameters. For example, crowdedness information can include or otherwise can be indicated by a numeric value that is indicative of one or more of the following: number of mobile devices present at or near each desired location, number of people (calculated based on the number of devices at or near each desired location), relative crowdedness of each location (relative to a fixed standard or relative to the capacity, e.g., percentage filled, of each location), and the like. In principle, this aspect of the invention works based on an assumption that a large (or at least a relatively predictable) number of people have mobile phones, so that the mobile critical mass information for a desired location can be converted into crowdedness information indicative of one of the above-enumerated parameters. For example, the MCM application program 38 may convert mobile critical mass information into crowdedness information by calculating that, on average, X number of detected portable communication devices corresponds to approximately Y number of people. Optionally, this calculation then can be related to a relative crowdedness, depending upon the specific parameters available with the MCM application program.

In one embodiment, the user is permitted to create a rating for crowdedness. For example, the user obtains crowdedness information for a given location (e.g., number of devices present at the given location). Upon visiting the given location, the user determines that the location is "moderately" crowded. The user is able to enter this "rating", which is used by the MCM application program to understand what this specific user considers to be "moderately" crowded. This rating may be associated with a specific preferred location (e.g., in my favorite location, 50-60 devices (or people calculated based on the number of devices) is moderately crowded), or may be used generically (e.g., a restaurant with more than 40 people is crowded). Those of skill in the art will appreciate that the rating parameters may be varied without departing from the scope of the present invention.

At step 140, the crowdedness information is displayed or otherwise output in a user-readable, user-understandable, user-sensible and/or user-defined format. As is shown and described below with reference to FIG. 5, the crowdedness information may be displayed graphically, e.g., on a map showing the user 60 and the desired locations 70 and 80. Other display formats and output formats are discussed below, and may be employed without departing from the scope of the present invention.

Figure 5:
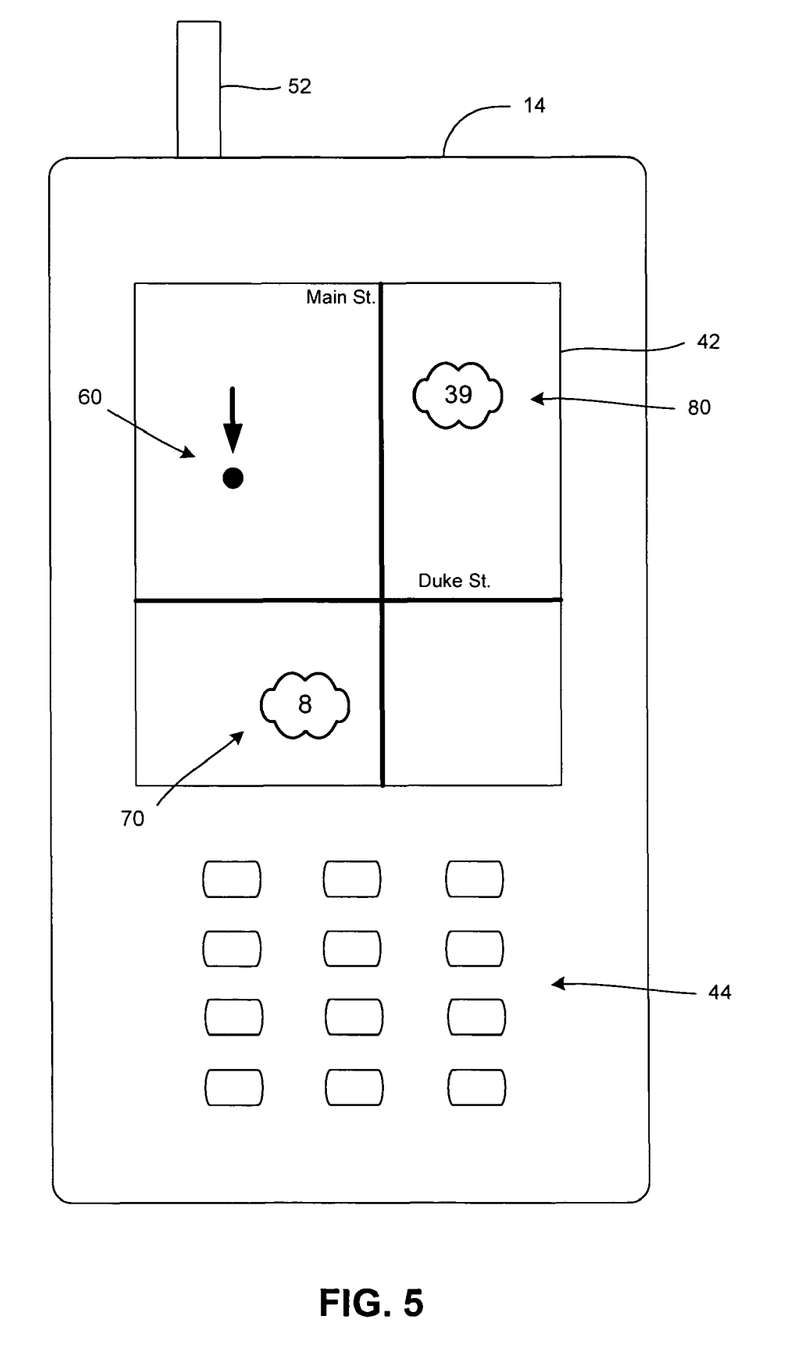
FIG. 5 is a diagrammatic illustration of a mobile terminal on which crowdedness information is displayed graphically in accordance with the present invention.

Referring now to FIG. 5, a diagrammatic illustration of a portable communication device 14 on which the crowdedness of a first location 70 and the crowdedness of a second location 80 are displayed graphically. In the illustrated embodiment, the graphical display includes a map in which the first and second locations 70 and 80 are displayed as clouds with a numeric value contained therein. It will be appreciated that clouds may be indicative of imprecision that is inherent in presence information received from the presence server. The numeric value is related to the crowdedness of each location. In the exemplary embodiment illustrated in FIG. 5, the second location 80 is indicated to be "more crowded" than the first location 70. Depending on the parameters of the MCM application program 38, the numeric value shown to indicate crowdedness may be indicative of one or more of the following: number of mobile devices present at or near each desired location, number of people (calculated based on the number of devices at or near each desired location), relative crowdedness of each location (relative to a fixed standard or relative to the capacity, e.g., percentage filled, of each location), and the like. Each of the above-identified parameters, and others, will be apparent to one of ordinary skill in the art upon reading the disclosure contained herein. Once the crowdedness information is displayed on the user's mobile device, the user can decide which location to visit based on whether the user desires to be near or away from a crowd.

Also displayed graphically on display 42 is the user 60 (actually the user's mobile device) relative to the desired location. In accordance with other embodiments discussed above, the display may show the user 60 and any crowds or numbers of subscribers in relative proximity, e.g., within two blocks or two miles, to the user. Such an application may be useful to reassure the user that other people are nearby, e.g., when the user is walking home alone at night.

While FIG. 5 depicts crowdedness information displayed on a map, it is to be appreciated that the crowdedness information may be displayed in any suitable graphical, text, audible or other human-sensible format. One example of a text format would be a listing of the desired locations selected by the user with a numeric crowdedness information value next to or adjacent each desired location. Other suitable crowdedness information display presentations and output presentations will occur to those of ordinary skill in the art upon reading the disclosure contained herein, and are within the scope of the invention. In an alternative embodiment, the mobile device can include a voice synthesizer that provides verbal information related to crowdedness information. Such an embodiment may find utility for visually impaired users and/or drivers who choose to drive away from crowds, but do not want to take their eyes off the road to view a display.

While the above discussion has focused on determining crowdedness of a desired location by requesting and receiving presence information for all users or subscribers, e.g., anonymous users or subscribers, it is to be appreciated that the present invention also finds application in connection with collecting presence information about a particular group. For example, members of a group or organization might find it useful to be able to locate nearby group members when separated at a large public venue, such as an amusement park. This application of the invention might also be useful for a member of a group or organization who arrives at a location, and is able to determine if other group members are present, and where the other group members are located.

This embodiment can be carried out in a manner similar to that described above with reference to FIGS. 1-5. In addition, members of a group or organization could register with a network application server (indicated by numeral 18 in FIG. 1), which may be the presence server 22, in order to obtain a group identifier to be included with the individual's presence information. In this embodiment, the MCM application in or on the user's mobile terminal would initiate a request for certain users in general, or in connection with a desired location, rather than any users in proximity to a certain location.

In accordance with another aspect of the invention, the MCM application program can include information about commonly desired landmarks, such as automatic teller machines (ATMs), gas stations and the like. This application may be useful for a user who is in an unfamiliar location. Other applications within the scope of the present invention will become apparent to skilled artisans upon reading the disclosure contained herein.

In accordance with another aspect of the invention, an application server (e.g., a location server or a presence server) can determine crowdedness information for a desired location consistent with one or more of the methods described herein. The application server could transmit a graphical depiction of crowdedness to the portable communication device (e.g., in a bitmap format or another suitable format) for display on the portable communication device. In this embodiment, the method can include collecting mobile critical mass information for a plurality of portable communication devices, converting the mobile critical mass information into crowdedness information for a given location, and transmitting the crowdedness information to a requesting portable communication device for output in a human-sensible format.

As will be appreciated by one of skill in the art, computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A method of determining where crowds exist, wherein the method is carried out using a portable communication device, the method comprising:
   requesting mobile critical mass information for at least one desired location from a mobile network server;
   receiving mobile critical mass information corresponding to the at least one desired location, the mobile critical mass information (i) including presence information for all users or subscribers in proximity to the at least one desired location, and (ii) being indicative of a number of portable communication devices in proximity to the at least one desired location;
   converting the received mobile critical mass information into crowdedness information based on user-defined criteria for converting received mobile critical mass information into crowdedness information, wherein the crowdedness information is indicative of crowdedness of the at least one desired location relative to the location's capacity; and
   outputting the crowdedness information in a user-sensible format, the outputting step including displaying crowdedness information in a graphical format on a map including the at least one desired location, wherein the desired location is transmitted and corresponds to the location from which mobile critical mass information is requested.

2. The method according to claim 1, wherein the mobile network server is a presence server.

3. The method according to claim 1, wherein steps of the method are executed according to an application program loaded or stored on a portable communication device.

4. The method according to claim 3, wherein the portable communication device is a mobile phone.

5. A program stored on a machine readable medium in the form of a memory, the program being suitable for use in a portable communication device, wherein when the program is loaded in memory in the portable communication device and executed causes the portable communication device to:
   request mobile critical mass information for at least one desired location from a mobile network server;
   receive mobile critical mass information corresponding to the at least one desired location, the mobile critical mass information (i) including presence information for all users or subscribers in proximity to the at least one desired location, and (ii) being indicative of a number of portable communication devices in proximity to the at least one desired location;
   convert the received mobile critical mass information into crowdedness information based on user-defined criteria for converting received mobile critical mass information into crowdedness information, wherein the crowdedness information is indicative of crowdedness of the at least one desired location relative to the location's capacity; and
   output the crowdedness information in a user-sensible format, the output step including displaying crowdedness information in a graphical format on a map including the at least one desired location, wherein the desired location is transmitted and corresponds to the location from which mobile critical mass information is requested.

6. The program according to claim 5, wherein the program causes the portable communication device to transmit its location when it requests mobile critical mass information.

7. The program according to claim 5, wherein the portable communication device is a mobile phone.

8. A portable communication device comprising:
   a memory; and
   a processor that executes an application program within the memory, the application program when executed causing the portable communication device to:
     request mobile critical mass information for at least one desired location from a mobile network server;
     receive mobile critical mass information corresponding to the at least one desired location, the mobile critical mass information (i) including presence information for all users or subscribers in proximity to the at least one desired location, and (ii) being indicative of a number of portable communication devices in proximity to the at least one desired location;
     convert the received mobile critical mass information into crowdedness information based on user-defined criteria for converting received mobile critical mass information into crowdedness information, wherein the crowdedness information is indicative of crowdedness of the at least one desired location relative to the location's capacity; and output the crowdedness information in a user-sensible format, the output step including displaying crowdedness information in a graphical format on a map including the at least one desired location, wherein the desired location is transmitted and corresponds to the location from which mobile critical mass information is requested.

* * * * *